United States Patent Office
3,483,186
Patented Dec. 9, 1969

3,483,186
2-BENZAZEPINE DERIVATIVES
Joseph Albert Meschino, North Wales, Pa., assignor to McNeil Laboratories, Inc., a corporation of Pennsylvania
No Drawing. Filed Nov. 22, 1966, Ser. No. 596,100
Int. Cl. C07d 41/08; A61k 27/00
U.S. Cl. 260—239
14 Claims

ABSTRACT OF THE DISCLOSURE

The compounds herein are derivatives of 4,5-dihydro-3H-2-benzazepine and 2,3,4,5-tetrahydro-1H-2-benzazepine, useful as hypotensives; and novel intermediates used in the preparation thereof.

---

This invention relates to novel organic compounds and, more particularly, to certain 2-benzazepine derivatives and to the method of preparation thereof. The invention also relates to new intermediate compounds involved in the synthesis of such 2-benzazepines.

The subject 2-benzazepines may be structurally represented by the following formulas:

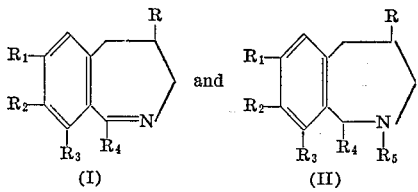

wherein R is a member selected from the group consisting of cyano, lower alkoxycarbonyl, carboxy, carbamoyl, N-(lower alkyl)-carbamoyl, N,N-di-(lower alkyl)carbamoyl and aminomethyl; $R_1$ is lower alkoxy, preferably methoxy; $R_2$ and $R_3$ are each a member selected from the group consisting of hydrogen and lower alkoxy, preferably methoxy; $R_4$ is a member selected from the group consisting of lower alkyl, phenyl and substituted phenyl, preferably halophenyl; and $R_5$ is a member selected from the group consisting of hydrogen, lower alkyl and aralkyl, e.g., phenethyl; provided that, when said $R_3$ is lower alkoxy, said $R_4$ is lower alkyl.

The compounds of Formula I may be denoted as 4,5-dihydro - 1 - $R_4$ - 4 - R - 7 - $R_1$ - 8 - $R_2$ - 9 - $R_3$ - 3H - 2-benzazepines; and of Formula II as 2,3,4,5-tetrahydro-1 - $R_4$ - 2 - $R_5$ - 4 - R - 7 - $R_1$ - 8 - $R_2$ - 9 - $R_3$ - 1H -2-benzazepines. As used herein, lower alkyl and lower alkoxy may be straight or branch chained saturated aliphatic hydrocarbons having from 1 to about 7 carbon atoms; halo stands for chloro, bromo, fluoro and iodo; and substituted phenyl stands for phenyl substituted by one or more groups such as, for example, halo, hydroxy, lower alkyl, trifluoromethyl, lower alkoxy, nitro, amino and alkylamino.

The 2-benzazepines represented by Formulas I and II have valuable pharmacological applications in view of their hypotensive activity. A lowering of blood pressure is observed, without deleterious side effects, when the compounds are administered to laboratory animals in either oral or parenteral pharmaceutical forms. As exemplified with 4,5 - dihydro - 4 - cyano, - 7,8 - dimethoxy - 1-phenyl-3H-2-benzazepine one of the preferred species herein, a fall in blood pressure of about 40 mm. mercury is obserbed upon intravenous administration to anesthetized dog at a dose of 10 mg./kg. Peripheral vasodilatory activity similar to papaverine is also observed. For example, in an anesthetized dog, doses ranging from 1 to 16 mg./kg. intravenously increase femoral blood flow from 20 to 150%, respectively. The subject 2-benzazepines can be administered in therapeutic dosages in conventional vehicles and pharmaceutical forms, for example, as tablets, capsules, suspensions, solutions, injectables and the like, which can be prepared in accordance with procedures well known in the art.

The subject compounds of Formula I, wherein R is cyano or lower alkoxycarbonyl, are obtained by cyclodehydrating a compound of Formula III:

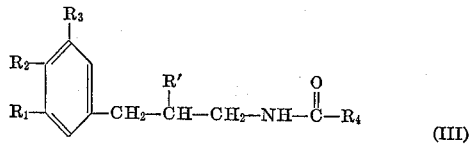

in which $R_1$, $R_2$, $R_3$ and $R_4$ are as previously described and R' stands for said cyano or lower alkoxycarbonyl. The cyclodehydration of (III) to yield the corresponding 4,5 - dihydro - 1 - $R_4$ - 4 - R' - 7 - $R_1$ - 8 - $R_2$ - 9 - $R_3$ - 3H-2-benzazepines may be achieved under acidic dehydrating conditions, for example, with such cyclodehydrating agents as anhydrous hydrofluoric acid, polyphosphoric acid, phosphorous oxychloride, phosphorous pentoxide and, preferably, mixtures of phosphorous oxychloride and phosphorous pentoxide. Typical organic solvents which may be suitably employed include the aromatic hydrocarbons such as benzene, toluene, xylene, and the like; halogenated hydrocarbons such as, for example, chloroform and methylene chloride; dimethylformamide; and ethers such as dioxane, tetrahydrofuran and the like. In certain cases, elevated temperatures may be advantageously employed to enhance the rate of reaction.

The other compounds of Formula I, that is, where R is carboxy, carbamoyl, N-(lower alkyl)carbamoyl, N,N-di(lower alkyl)-carbamoyl or aminomethyl may be obtained by appropriate transformation of the R' group in the 4,5-dihydro-3H-2-benzazepines obtained from the cyclodehydration of (III). For example, hydrolysis of the cyano function (i.e., R' is —CN) affords the corresponding 4,5-dihydro-1-$R_4$-4-carbamoyl-7-$R_1$-8-$R_2$-9-$R_3$-3H-2-benzazepines of this invention.

Reduction of the cyano function, for example, with lithium aluminum hydride, affords a mixture of the corresponding 4-aminomethyl - 2 - benzazepines of Formula I and the corresponding 4 - aminomethyl - 2 - benzazepines of Formula II which are separable by conventional techniques, for example, by appropriate conversion of the mixture into salts with a suitable organic acid, e.g., fumaric acid, which conversion results in the precipitation of one of the two salts.

Hydrolysis of the ester function (i.e., R' is lower alkoxycarbonyl) affords the corresponding 4,5 - dihydro-1-$R_4$-4 - carboxy - 7 - $R_1$-8-$R_2$-9-$R_3$-3H-2 - benzazepines, the carboxy function of which may be subsequently converted to an acid halide that is then treated with a primary or secondary alkylamine to yield the corresponding 4-(N' - lower alkycarbamoyl) and 4 - (N',N' - di-lower alkylcarbamoyl) derivatives, respectively, of 4,5-dihydro-1 - $R_4$-7-$R_1$ - 8 - $R_2$-9-$R_3$-3H-2-benzazepine. Alternatively, said 4,5-dihydro 1 - $R_4$ - 4 - (N'-lower alkylcarbamoyl) - 7 - $R_1$-8-$R_2$-9-$R_3$-3H - 2 - benzazepines, wherein the lower alkyl is a secondary or tertiary alkyl, may be obtained by treatment of the corresponding 4 - cyano derivative with an appropriate secondary or tertiary alkanol, respectively, in strongly acidic media according to a Ritter type reaction.

The 2,3,4,5 - tetrahydro - 1H - 2 - benzazepines represented by Formula II, wherein $R_5$ is hydrogen, are obtained by saturation of the double bond between positions $C_1$ and $N_2$ in the corresponding 4,5-dihydro - 3H - 2-benzazepines of Formula I, for example, by means of catalytic hydrogenation. Introduction of a lower alkyl or aralkyl group onto the 2-position of the 2-benzazepine nucleus, i.e., onto the ring nitrogen, may be accomplished by quarternizing the corresponding compound of Formula I with an appropriate lower alkyl halide, followed by hydrogen saturation of the $C_1$, $N_2$-double bond of the thus obtained alkyl benzazepinium halide, e.g., by means of catalytic hydrogenation, or with complex metal hydrides such as lithium aluminum hydride, sodium borohydride and the like, and then neutralizing the thus obtained acid halide salt by treatment with suitable alkali, e.g., an alkali metal hydroxide.

The starting materials (III) are also novel and, as such, constitute an additional feature of this invention. In addition to their utility in synthesizing the 2 - benzazepines described herein, they also have valuable pharmacological and pharmaceutical applications in view of their central nervous system (CNS) depressant activity. Typical of the CNS activity observed with these compounds upon oral or parenteral administration to laboratory animals is the following: at a dose of 100 mg./kg. of N-[2-cyano-3-(3',4'-dimethoxyphenyl)-propyl]benzamide, one of the preferred species, administered interperitoneally to a mouse, the animal becomes ataxic with a decrease in muscle tone and impairment of the righting reflex. Ptosis is also observed. These effects are seen 15 minutes after administration and generally last for a period of over one hour. These novel compounds can be administered in therapeutic dosages in conventional pharmaceutical formulations for oral and parenteral administration.

In general, the compounds of Formula III are prepared by conventional acylation of a compound having the Formula IV:

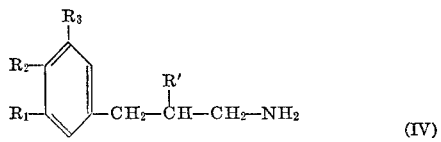

(IV)

wherein R', $R_1$, $R_2$ and $R_3$ are as previously described, with and appropriate acylating agent such as will produce the desired acyl moiety, i.e., —$COR_4$, on the amino nitrogen of (IV). Examplary acylating agents are the lower alkanoic acid anhydrides, e.g., acetic acid anhydride, propionic acid anhydride and the like; lower alkanoic acid halides, e.g., acetyl chloride, butyryl chloride and the like; and benzoyl and substituted benzoyl halides. The noval compounds (IV) being useful in the syntheses described herein, constitute another aspect of this invention.

The compounds represented by Formula IV are readily obtainable from the reduction of an appropriate compound of Formula V:

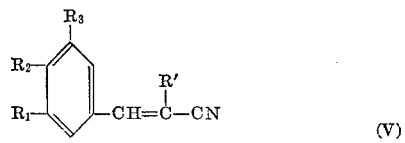

(V)

wherein R', $R_1$, $R_2$ and $R_3$ are as previously described. When R' is cyano, the reduction is preferably conducted with a metal hydride such as sodium borohydride in a non-hydroxylic organic solvent, e.g., 1,2-dimethoxyethane, ethylene glycol dimethyl ether, tetrahydrofuran, dioxane and the like. When R' is lower alkoxycarbonyl, the reduction is preferably carried out by means of catalytic hydrogenation. The compounds of Formula V may be prepared by treating 3,5-di-alkoxybenzaldehyde with malononitrile or a lower alkyl cyanoacetate in an appropriate solvent such as dioxane containing a small amount of piperidine according to the method described by F. D. Popp, J. Org. Chem. 25, 646 (1960) to yield the desired R'=cyano or R'=lower alkoxy-carbonyl derivative, respectively. The following compounds of Formula V are believed to be novel:

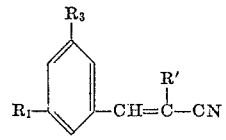

wherein R' is a member selected from the group consisting of cyano and lower alkoxycarbonyl; $R_1$ is lower alkoxy; and $R_3$ is a member selected from the group consisting of hydrogen and lower alkoxy; provided that when $R_3$ is hydrogen, said R' is cyano. In view of their novelty and usefulness as starting materials for the syntheses described herein, such heretofore unknown compounds constitute a further feature of this invention.

The following examples are intended to illustrate, but not to limit, the scope of the present invention.

EXAMPLE I (A) To a mixture of 0.2 mole of malononitrile and 0.2 mole of 3,5-dimethoxybenzaldehyde in about 60 ml. of dioxane at 0° C. is added a few drops of piperidine. On standing at room temperature, the product α-cyano-3,5 - dimethoxycinnamo-nitrile, crystallizes out and is filtered off.

(B) The product, α-cyano - 3 - methoxycinnamonitrile, is obtained according to the foregoing procedure by reacting an equivalent quantity of 3-methoxybenzaldehyde with the malononitrile.

(C) By substituting an equivalent quantity each of ethyl cyanoacetate and n-propyl cyanoacetate for the malononitrile in the procedure of Example I-A, the respective products, ethyl α-cyano - 3,5 - dimethoxycinnamate and n-propyl α-cyano - 3,5 - dimethoxycinnamate are obtained.

EXAMPLE II (A) To a mixture of 38 g. (1.0 mole) of sodium borohydride and 500 ml. of 1,2-dimethoxyethane is added with stirring 42.8 (0.2 mole) of α-cyano-3,4-dimethoxycinnamonitrile. The temperature is maintained between 20–30° C. When the addition is complete, the mixture is heated to reflux for several hours after which it is cooled in an ice-bath and treated successively with 50 ml. of water and an excess of dilute acetic acid. After stirring for about an hour, the 1,2-dimethoxyethane is removed by distillation under vacuum. The residue is made strongly acidic with dilute hydrochloric acid and shaken once with ethyl acetate. The aqueous layer is separated off and made basic with 50% sodium hydroxide solution after which it is shaken with methylene chloride. After drying over magnesium sulfate, the methylene chloride is removed by distillation to leave α-aminomethyl - 3,4-dimethoxy-hydroxy-hydrocinnamonitrile as an oil. The fumarate, prepared in absolute ethanol, melts at 167–169° C.

*Analysis.*—Calcd. for $C_{12}H_{16}N_2O_2 \cdot C_4H_4O_4$: C, 60.42; H, 6.52; N, 10.07%. Found: C, 60.55; H, 6.53; N, 10.52%.

(B) In accordance with the procedure of Example II-A, an equivalent quantity each of α-cyano-3-methoxycinnamonitrile, α-cyano-3,5-dimethoxycinnamonitrile and α-cyano-3,4,5-trimethoxy-cinnamonitrile is converted to α-aminomethyl-3-methoxy-hydrocinnamonitrile, α-aminomethyl-3,5-dimethoxy-hydrocinnamonitrile and α-aminomethyl-3,4,5-trimethoxy-hydrocinnamonitrile, respectively. The fumarate of the latter melts at 164–166° C.

EXAMPLE III (A) A mixture of 13.5 g. (0.05 mole) of ethyl α-cyano-3,4-dimethoxycinnamate, 0.5 g. of Adams' catalyst ($PtO_2$), 5 g. (0.05 mole) of sulfuric acid and 200 ml. of acetic acid is shaken under three atmospheres of hydrogen gas until the theoretical amount of hydrogen is taken up. The catalyst is then removed by filtration and the filtrate concentrated under vacuum. The residue is diluted with 200 ml. of water, made basic with 50% sodium hydroxide solution and shaken with several portions of methylene chloride, the layers being separated each time. The combined methylene chloride fractions are dried over magnesium sulfate and the solvent is removed by distillation to give ethyl α-aminomethyl-3,4-dimethoxy-hydrocinnamate as an oil. The fumarate, prepared in absolute ethanol, melts at 131–134° C.

*Analysis.*—Calcd. for $C_{14}H_{21}NO_4 \cdot C_4H_4O_4$: N, 3.65%. Found: N, 3.50%.

(B) In accordance with the procedure of Example III–A, an equivalent quantity each of ethyl α-cyano-3-methoxy - cinnamate, ethyl α - cyano-3,5-dimethoxycinnamate, n-propyl α-cyano-3,5-dimethoxycinnamate, and ethyl α-cyano-3,4,5-trimethoxycinnamate is converted to ethyl α-aminomethyl-3-methoxy-hydrocinnamate, ethyl α-aminomethyl-3,5-dimethoxy-hydrocinnamate, n-propyl α-aminomethyl-3,5-dimethoxy-hydrocinnamate and ethyl α-aminomethyl - 3,4,5-trimethoxy-hydrocinnamate, respectively. The fumarate of the latter melts at 139–141° C.

EXAMPLE IV (A) To a solution of 22 g. (0.1 mole) of α-aminomethyl-3,4-dimethoxy-hydrocinnamonitrile in 250 ml. of methylene chloride containing 20 ml. of pyridine is added with stirring a solution of 20 g. (0.11 mole) of benzoyl chloride so that the temperature does not exceed 20° C. External cooling is necessary. After stirring for 2 hours, 250 ml. of water is added and the layers are separated. The organic layer is washed successively with dilute hydrochloric acid and dilute potassium carbonate solution after which it is dried over magnesium sulfate and concentrated to dryness. The product is recrystallized from 95% ethanol to give N-[2-cyano-3-(3',4'-dimethoxyphenyl)propyl]-benzamide, M.P. 133–135° C.

*Analysis.*—Calcd. for $C_{19}H_{20}N_2O_3$: C, 70.35; H, 6.22; N, 8.64%. Found: C, 70.46; H, 6.28; N, 8.77%.

(B) By repeating the acylation procedure of Example IV–A with an equivalent quantity of α-aminomethyl-3-methoxy-hydrocinnamonitrile as the starting material, there is obtained N-[2-cyano-3-(3'-methoxyphenyl)-propyl]benzamide.

EXAMPLE V (A) The acetylation procedure of Example IV–A is followed using an equivalent amount of an appropriate α-aminomethyl-hydrocinnamonitrile obtained from Example II as the starting material and, as the acylating agent, an equivalent quantity of acetyl chloride or butyryl chloride, respectively. The following products are obtained:

N-[2-cyano-3-(3'-methoxyphenyl)propyl]acetamide;
N-[2-cyano-3-(3',4'-dimethoxyphenyl)propyl]butyramide;
N-[2-cyano-3-(3',5'-dimethoxyphenyl)propyl]butyramide; and
N-[2-cyano-3-(3',4',5'-trimethoxyphenyl)propyl]acetamide.

EXAMPLE VI (A) To a cooled solution of 32.4 g. (0.12 mole) of ethyl α-aminomethyl-3,4-dimethoxy-hydrocinnamate and 20 g. (0.25 mole) of pyridine in 300 ml. of dry benzene is added with stirring 21 g. (0.15 mole) of benzoyl chloride at such a rate that the temperature does not exceed 10° C. External cooling is necessary. After stirring at room temperature for an additional 1.5 hours, 300 ml. of water is added and the layers are separated. The aqueous layer is washed once with ethyl acetate and then discarded. The combined organic solutions are washed successively with dilute hydrochloric acid, water and dilute sodium bicarbonate solution after which they are concentrated to dryness. Recrystallization of the residue from 95% ethanol gives N-[2-ethoxycarbonyl-3-(3'4'-dimethoxyphenyl)propyl]benzamide, M.P. 91–94° C.

*Analysis.*—Calcd. for $C_{21}H_{25}NO_5$: C, 67.90; H, 6.78; N, 3.77%. Found: C, 69.59; H, 6.98; N, 4.07%.

(B) By repeating the acylation procedure of Example VI–A with an equivalent quantity of ethyl α-aminomethyl-3-methoxy-hydrocinnamate as the starting materials, the corresponding N - [2 - ethoxycarbonyl-3-(3'-methoxyphenyl)propyl]benzamide is obtained.

EXAMPLE VII

The acylated derivatives listed below are obtained in accordance with acetylation procedure outlined in Example VI–A using, as the starting material, an equivalent amount of an appropriate lower alkyl α-aminomethyl-hydrocinnamate obtained from Example III and, as the acylating agent, an equivalent quantity of acetyl chloride or butyryl chloride:

N-[2-ethoxycarbonyl-3-(3'-methoxyphenyl) propyl] butyramide;
N-[2-n-propoxycarbonyl-3-(3',5'-dimethoxyphenyl) propyl]acetamide;
N-[2-ethoxycarbonyl-3-(3',4'-dimethoxyphenyl) propyl]acetamide; and
N-[2-ethoxycarbonyl-3-(3',4',5'-trimethoxyphenyl) propyl]acetamide.

EXAMPLE VIII (A) A solution of 29.5 g. (0.09 mole) of N-[2-cyano-3-(3',4'-dimethoxyphenyl)propyl]benzamide in 200 ml. of phosphorous oxychloride is refluxed for 2 hours. The mixture is cooled and 10 g. of phosphorous pentoxide is added after which refluxing is commenced with stirring. After one hour, 10 g. more of phosphorous pentoxide is added and the mixture stirred and refluxed for one hour longer. Most of the solvent is then removed by distillation under vacuum and the residue poured into iced water. The resulting solution is filtered and made basic with 50% sodium hydroxide solution. The crystalline precipitate is filtered off and dissolved in methylene chloride after which it is dried over magnesium sulfate. Removal of the solvent and recrystallation of the residue from absolute ethanol, gives 4,5 - dihydro - 1 - phenyl - 4 - cyano - 7,8 - dimethoxy-3H-2-benzazepine, M.P. 145–147° C.

*Analysis.*—Calcd. for: $C_{19}H_{18}N_2O_2$: C, 74.49; H, 5.92; N, 9.15%. Found: C, 74.32; H, 5.99; N, 9.50%.

(B) The cyclodehydration procedure of Example VIII–A is repeated except that, as the starting material, an equivalent quantity of an appropriate amide obtained from Examples IV–B and V is used. The following 4-cyano-2-benzazepines are thus obtained:

4,5-dihydro-1-phenyl-4-cyano-7-methoxy-3H-2-benzazepine;
4,5-dihydro-1-methyl-4-cyano-7-methoxy-3H-2-benzazepine;
4,5-dihydro-1-propyl-4-cyano-7,8-dimethoxy-3H-2-benzazepine;
4,5-dihydro-1-propyl-4-cyano-7,9-dimethoxy-3H-2-benzazepine; and
4,5-dihydro-1-methyl-4-cyano-7,8,9-trimethoxy-3H-2-benzazepine.

EXAMPLE IX

A solution of 30.6 g. (0.08 mole) of N-[2-ethoxycarbonyl - 3 - (3',4' - dimethoxyphenyl)propyl]benzamide in 100 ml. of phosphorous oxychloride is refluxed for 2 hours. Ten grams of phosphorous pentoxide is then added and the mixture stirred and refluxed for one hour longer. Most of the solvent is removed under reduced pressure after which the residue is poured into a large volume of water. Shaking once with ethyl acetate removes any non-basic material and the aqueous solution is then made basic with 50% sodium hydroxide solution. The resulting precipitate is dissolved in methylene chloride after which the solution is dried over magnesium sulfate and concentrated to dryness in vacuo. The residue is recrystallized from 95% ethanol to give 4,5-dihydro-1-phenyl-4-ethoxycarbonyl - 7,8 - dimethoxy-3H-2-benzazepine, M.P. 101–103° C.

*Analysis.*—Calcd. for $C_{21}H_{23}NO_4$: C, 71.37; H, 6.56; N, 3.96%. C, 71.06; H, 6.50; N, 3.92%.

EXAMPLE X

The cyclodehydration procedure of Example IX is repeated except that, as the starting material, an equivalent quantity of an appropriate amide obtained from Examples VI and VII is used. The following 4-alkoxycarbonyl-3-benzazepines are thus obtained.

4,5-dihydro-1-phenyl-4-ethoxycarbonyl-7-methoxy-3H-2-benzazepine;
4,5-dihydro-1-propyl-4-ethoxycarbonyl-7-methoxy-3H-2-benzazepine;
4,5-dihydro-1-methyl-4-n-propoxycarbonyl-7,9-dimethoxy-3H-2-benzazepine;
4,5-dihydro-1-methyl-4-ethoxycarbonyl-7,8-dimethoxy-3H-2-benzazepine; and
4,5-dihydro-1-methyl-4-ethoxycarbonyl-7,8,9-trimethoxy-3H-2-benzazepine, M.P. HCl salt: 165–166° C.

EXAMPLE XI

A mixture of 10 g. (0.028 mole) of 4,5-dihydro-1-phenyl - 4 - ethoxycarbonyl-7,8-dimethoxy-3H-2-benzazepine and 300 ml. (0.03 mole) of 0.1 N sodium hydroxide containing 50 ml. of methanol is stirred and heated on a steam bath for 1.5 hours. After cooling, 300 ml. (0.03 mole) of 0.1 N hydrochloric acid is added and the methanol removed by distillation. The aqueous residue is then continuously extracted with methylene chloride to yield a yellow solid which on trituration in ether crystallizes to a white product, M.P. 160–162° C. Recrystallization from chloroform-hexane gives 4,5-dihydro-1-phenyl-4-carboxy-7,8-dimethoxy-3H-2-benzazepine as a hydrate, M.P. 206.5–208.5° C. Drying at 100°/0.1 mm. gives an anhydrous product of about the same melting point.

*Analysis.*—Calcd. for $C_{19}H_{19}NO_4$: C, 70.14; H, 5.89; N, 4.31%. Found: C, 69.89; H, 5.93; N, 4.42%.

EXAMPLE XII

An equivalent quantity of each of the 4-alkoxycarbonyl-2-benzazepines obtained in Example X is hydrolyzed according to the procedure outlined in Example XI to yield, as respective products, the corresponding 4-carboxy derivatives.

EXAMPLE XIII 5 g. (0.016 mole) of 4,5-dihydro-1-phenyl-4-cyano-7,8-dimethoxy-3H-2-benzazepine is added slowly to 20 ml. of concentrated sulfuric acid. The temperature of the reaction mixture rises slowly to about 40° C. and is stirred at ambient temperature for 2 hours. The reaction mixture is then poured onto ice and neutralized with potassium carbonate. The resulting precipitate is dissolved in methylene chloride and the solution is dried over magnesium sulfate. The solvent is distilled in vacuo and the glassy residue is recrystallized from ethyl acetate to give 4,5-dihydro - 1 - phenyl - 4 - carbamoyl-7,8-dimethoxy-3H-2-benzazepine; M.P. 170–172° C.

*Analysis.*—Calcd. for $C_{19}H_{20}N_2O_3$: N, 8.64%. Found: N, 8.62%.

EXAMPLE XIV

The hydrolysis procedure of Example XIII is repeated except that an equivalent quantity of each of the respective 4-cyano-2-benzazepines obtained in Example VIII–B is used as the starting material to yield, as respective products, the corresponding 4-carbamoyl derivatives.

EXAMPLE XV (A) A solution of 18 g. (0.058 mole) of 4,5-dihydro-1-phenyl - 4 - cyano - 7,8 - dimethoxy - 3H - 2 - benzazepine and 4.3 g. (0.058 mole) of t-butyl alcohol in 50 ml. of glacial acetic acid is cooled to 10–15° C. and treated with 12 g. (0.116 mole) of concentrated sulfuric acid. The reaction mixture is allowed to remain at room temperature overnight. The reaction mixture is then poured onto ice and basified with 50% sodium hydroxide solution. The product is dissolved in methylene chloride, dried over magnesium sulfate and the solvent distilled in vacuo leaving a glassy residue which is dissolved in hot heptane. The product, 4,5-dihydro-1-phenyl-4-(N'-t-butylcarbamoyl)-7,8-dimethoxy-3H-2-benzazepine, crystallizes out and is collected by filtration, M.P. 147–148° C.

*Analysis.*—Calcd. for $C_{23}H_{28}N_2O_3$: N, 7.36%. Found: N, 7.50%.

(B) By repeating the procedure of Example XV–A with an equivalent quantity of each of the 4-cyano derivatives obtained in Example VIII–B, the corresponding 4,5-dihydro-4-(N'-t-butylcarbamoyl)-3H-2-benzazepines are obtained.

(C) Other 4-(N'-alkylcarbamoyl)-2-benzazepines are obtained by substituting an equivalent amount of an appropriate secondary or tertiary lower alkanol for the t-butyl alcohol in the foregoing procedures.

EXAMPLE XVI (A) Twenty-five grams (0.07 mole) of 4,5-dihydro-1-phenyl - 4 - ethoxycarbonyl - 7,8 - dimethoxy - 3H - 2 - benzazepine is refluxed in 150 ml. of water and 150 ml. of methanol containing 3.5 g. (0.09 mole) of sodium hydroxide. After 1.5 hours, the mixture is concentrated to dryness in vacuo. The residue crystallizes in absolute ethanol. The filtered solid is suspended in 300 ml. of benzene and a portion of the solvent is removed by distillation. To the stirred suspension is added 9.5 g. (0.075 mole) of oxalyl chloride and the mixture is stirred for about one hour after which it is brought to reflux briefly. It is then cooled and 9.5 g. (0.2 mole) of dimethylamine in 10 ml. of water is added to the reaction mixture and the layers are separated. The organic layer is washed with water and concentrated to dryness. The residue is recrystallized from acetone petroleum ether to give 4,5-dihydro - 1 - phenyl - 4 - (N',N' - dimethylcarbamoyl)-7,8-dimethoxy-3H-2-benzazepine, M.P. 152–154° C.

*Analysis.*—Calcd. for $C_{21}H_{24}N_2O_3$: C, 71.57; H, 6.86; N, 7.95%. Found: C, 71.41; H, 6.86; N, 7.86%.

(B) If the procedure of Example XVI–A is repeated with an equivalent quantity of ethylamine used in place of the dimethylamine used therein, 4,5-dihydro-1-phenyl-4 - (N' - ethylcarbamoyl) - 7,8 - dimethoxy - 3H - 2 - benzazepine is obtained as the product.

(C) The procedure of Example XVI–A is repeated except that an equivalent quantity of each of the 4-alkoxycarbonyl-2-benzazepines obtained in Example X is used as the starting material to yield, as respective products, the corresponding 4-(N',N'-dimethylcarbamoyl)-derivatives.

EXAMPLE XVII (A) To a stirred, cooled (10° C.) solution of ethyl α-aminomethyl-3,4-dimethoxy-hydrocinnamate (22 g., 0.083 mole) and pyridine (13 g., 0.16 mole) in 200 ml. of benzene is added p-chlorobenzoyl chloride (15 g., 0.085 mole) so that the temperature does not exceed 25° C. After three hours, 200 ml. of water is added to the mixture and the layers are separated. The aqueous layer is washed once with ethyl acetate. The combined organic layers are washed successively with water, dilute hydrochloric acid and saturated brine. Evaporation of the solvent leaves N - [2 - ethoxycarbonyl - 3 - (3',4' - dimethoxyphenyl) propyl]-p-chloro-benzamide. This product is dissolved in 100 ml. of phosphorous oxychloride and refluxed therein for 1.5 hours after which 10 g. of phosphorous pentoxide is added. The mixture is stirred and refluxed for another 2 hours. Most of the phosphorous oxychloride is then distilled off under vacuum and the residue is poured into a large volume of water. Ethyl acetate (200 ml.) is added and, after shaking, the layers are separated. The aqueous layer is washed once with ether and then made basic with 50% sodium hydroxide solution. The product is then extracted with methylene chloride. Evaporation of the solvent leaves an oil which crystallizes from aqueous ethanol to give 4,5-dihydro-1-(p-chlorophenyl)-4-ethoxycarbonyl-7,8-dimethoxy-3H-2-benzazepine, M.P. 122–124° C.

Analysis.—Calcd. for: $C_{21}H_{22}NO_4Cl$: C, 65.03; H, 5.72; N, 3.61%. Found: C, 65.35; H, 5.87; N, 3.67%.

(B) The procedure of Example XVII–A is repeated with, respectively, an equivalent amount of ethyl α-aminomethyl - 3 - methoxy - hydrocinnamate, α - aminomethyl-3-methoxy-hydrocinnamonitrile and α-aminomethyl-3,4-dimethoxy-hydrocinnamonitrile as the starting material to yield, as respective products, 4,5-dihydro-1-(p-chlorophenyl) - 4 - ethoxycarbonyl - 7 - methoxy - 3H - 2-benzazepine (M.P. 94.5–96.5° C.), 4,5-dihydro-1-(p-chlorophenyl) - 4 - cyano - 7 - methoxy - 3H - 2 - benzazepine and 4,5-dihydro-1-(p-chlorophenyl)-4-cyano-7,8-dimethoxy-3H-2-benzazepine.

EXAMPLE XVIII (A) An equivalent quantity of 4,5-dihydro-1-(p-chlorophenyl) - 4 - ethoxycarbonyl - 7,8 - dimethoxy - 3H - 2-benzazepine is used as the starting material in the procedures of Examples XI, XVI–A and XVI–B to yield, as respective products, the corresponding 4-carboxy, 4-(N',N'-dimethylcarbamoyl) and 4-(N'-ethylcarbamoyl) derivative of 4,5-dihydro-1-(p-chlorophenyl)-7,8-dimethoxy-3H-2-benzazepine.

(B) By repeating the procedures of Examples XIII and XV–A with an equivalent quantity of 4,5-dihydro-1-(p-chlorophenyl) - 4 - cyano - 7 - methoxy - 3H - 2 - benzazepine as the starting material, the corresponding 4-carbamoyl and 4-(N'-t-butylcarbamoyl) derivative, respectively, of 4,5-dihydro-1-(p-chlorophenyl)-7-methoxy-3H-2-benzazepine is obtained.

EXAMPLE XIX (A) A suspension of 9.8 g. (0.26 mole) of lithium aluminum hydride in 600 ml. of ether is refluxed under a porous thimble containing 20 g. (0.065 mole) of 4,5-dihydro - 1-phenyl-4-cyano-7,8-dimethoxy-3H-2-benzazepine until all of the solid has been dissolved. The reaction mixture is then treated with 40 ml. of water and filtered. The filter cake is washed several times with ether and finally with hot 1,2-dimethoxyethane. The combined organic filtrates are concentrated to dryness in vacuo. The oily residue is dissolved in 100 ml. of methanol and treated with 7.5 g. (0.065 mole) of fumaric acid. The resulting precipitate of 2,3,4,5-tetrahydro-1-phenyl-4-aminomethyl-7,8-dimethoxy-1H-2-benzazepine fumarate is collected by filtration. Recrystallization from aqueous ethanol gives a product melting at 239–241° C. Treatment with appropriate alkali affords the corresponding free base.

Analysis.—Calcd. for $C_{19}H_{24}N_2O_2 \cdot C_4H_4O_4$: C, 64.47; H, 6.59; N, 6.54%. Found: C, 64.51; H, 6.63; N, 6.50%.

(B) The filtrate from the preparation of the above described fumarate is concentrated to dryness in vacuo, made basic with 50% sodium hydroxide and the resulting precipitate dissolved in methylene chloride. Removal of the solvent leaves 4,5-dihydro-1-phenyl-4-aminomethyl-7,8-dimethoxy-3H-2-benzazepine as a glass which is converted to the perchlorate salt, M.P. 189–191° C., by treatment with perchloric acid in aqueous ethanol. The analysis indicates that two molecules of perchloric acid and one molecule of water are associated with the base.

Analysis.—Calcd. for: $C_{19}H_{22}N_2O_2 \cdot 2HClO_4 \cdot H_2O$: C, 43.11; H, 4.95; N, 5.29; Cl, 13.40%. Found: C, 43.27; H, 5.02; N, 5.23; Cl, 12.88%.

EXAMPLE XX

A mixture of 12 g. (0.037 mole) of 4,5-dihydro-1-phenyl-4-carbamoyl-7,8-dimethoxy-3H-2 benzazepine and 0.5 g. of Adams' catalyst in 50 ml. of ethyl alcohol is shaken under 50 lbs. of hydrogen pressure. Enough concentrated hydrochloric acid is then added to dissolve the resulting solid and the catalyst is filtered off. The product is precipitated by neutralization with 50% sodium hydroxide solution. Water and ice are then added and the solid filtered off. Recrystallization from ethyl alcohol gives 2,3,4,5 - tetrahydro - 1 - phenyl-4-carbamoyl-7,8-dimethoxy-1H-2-benzazepine as a hemihydrate, M.P. 200–202° C.

Analysis.—Calcd. for: $C_{19}H_{22}N_2O_3 \cdot \frac{1}{2}H_2O$: C, 68.04; H, 6.91; N, 8.35; $H_2O$, 2.68%. Found: C, 68.09; H, 7.01; N, 8.65; $H_2O$, 2.7%.

EXAMPLE XXI

The product of Example XX is alternatively obtained by the following procedure. A solution of 7 g. (0.02 mole) of 4,5 - dihydro-1-phenyl-4-carbamoyl-7,8-dimethoxy-3H-2-benzazepine in 100 ml. of isopropyl alcohol is treated with 0.82 g. (0.02 mole) of sodium borohydride. After stirring for 3 hours, the mixture is treated successively with 50 ml. of water and enough dilute acetic acid to hydrolyze the excess borohydride. Most of the solvent is removed by vacuum distillation after which the residue is dissolved in water. The solution is then basified with 50% sodium hydroxide solution and the resulting precipitate dissolved in methylene chloride. Evaporation of the solvent leaves the product which is purified as described in Example XX.

EXAMPLE XXII

The hydrogenation procedure of Example XX is repeated except that an equivalent quantity of an appropriate 4,5-dihydro-3H-2-benzazepine obtained from the previous examples is used as the starting material to obtain the respective products listed below:

| Source of Starting Material | Product (Base=2,3,4,5-tetrahydro-1H-2-benzazepine) |
|---|---|
| Example: | |
| VIII–A | 1-phenyl-4-cyano-7,8-dimethoxy-Base. |
| VIII–B | 1-phenyl-4-cyano-7-methoxy-Base. |
| VIII–B | 1-methyl-4-cyano-7,8,9-trimethoxy-Base. |
| IX | 1-phenyl-4-ethoxycarbonyl-7,8-dimethoxy-Base. |
| X | 1-methyl-4-propoxycarbonyl-7,9-dimethoxy-Base. |
| XII | 1-phenyl-4-carboxy-7-methoxy-Base. |
| XIII | 1-phenyl-4-carbamoyl-7,8-dimethoxy-Base. |
| XIV | 1-propyl-4-carbamoyl-7,9-dimethoxy-Base. |
| XV–A | 1-phenyl-4-(N'-t-butylcarbamoyl)-7,8-dimethoxy-Base. |
| XVI–A | 1-phenyl-4-(N',N'-dimethycarbamoyl)-7,8-dimethoxy-Base. |
| XVI–B | 1-phenyl-4-(N'-ethylcarbamoyl)-7,8-dimethoxy-Base. |
| XVII–A | 1-(p-chlorophenyl)-4-ethoxycarbonyl-7,8-dimethoxy-Base. |
| XVII–B | 1-(p-chlorophenyl)-4-cyano-7-methoxy-Base. |
| XVIII–A | 1-(p-chlorophenyl)-4-carboxy-7,8-dimethoxy-Base. |
| XVIII–A | 1-(p-chlorophenyl)-4-(N',N'-dimethylcarbamoyl)-7,8-dimethoxy-Base. |
| XVIII–A | 1-(p-chlorophenyl)-4-(N'-ethylcarbamoyl)-7,8-dimethoxy-Base. |
| XVIII–B | 1-(p-chlorophenyl)-4-(N'-t-butylcarbamoyl)-7,8-dimethoxy-Base. |
| XVIII–B | 1-(p-chlorophenyl)-4-carbamoyl-7,8-dimethoxy-Base. |

EXAMPLE XXIII (A) A solution of 14 g. (0.04 mole) of 4,5-dihydro-1-phenyl - 4 - (N'-t-butylcarbamoyl)-7,8-dimethoxy-3H-2-benzazepine and 10 g. (0.07 mole) of methyl iodide in 150 ml. of methanol is refluxed for about 3 hours. About 75 ml. of solvent is removed by distillation and the residue diluted with diethyl ether. The resulting precipitate is collected by filtration and recrystallized from ethanol-diethyl ether to give 4,5-dihydro-1-phenyl-2-methyl-4-(N'-t - butylcarbamoyl) - 7,8-dimethoxy-3H-2-benzazepinium iodide, M.P. 253–255° C. (dec.).

Analysis.—Calcd. for: $C_{24}H_{31}IN_2O_3$: N, 5.36%. Found: N, 5.55%.

A mixture of 21.5 g. (0.04 mole) of the thus obtained benzazepinium iodide and 1 g. of Adams' catalyst in 200 ml. of absolute ethanol is shaken under three atmospheres of hydrogen pressure. After the theoretical amount of hydrogen is absorbed, the resulting mixture is basified with 50% sodium hydroxide solution and filtered. The mixture of solids is heated in enough methanol to dissolve the organic components after which the catalyst is removed by filtration. On cooling, 2,3,4,5 - tetrahydro - 1-phenyl-2-methyl - 4 - (N'-t-butylcarbamoyl)-7,8-dimethoxy-1H-2-benzazepine, M.P. 195–197° C., precipitates out and is collected by filtration.

*Analysis.*—Calcd. for $C_{24}H_{32}N_2O_3$: N, 7.07%. Found: N, 7.12%.

(B) The foregoing alkylation procedure is repeated except that an equivalent quantity each of ethyl iodide and 2-phenethyl bromide is used in place of the methyl iodide used therein to yield the corresponding 2-ethyl and 2-($\beta$-phenethyl) derivative of 2,3,4,5-tetrahydro-1-phenyl-4-(N' - t-butylcarbamoyl)-7,8-dimethoxy-1H-2-benzazepine, respectively.

EXAMPLE XXIV

The alkylation procedures of Example XXIII are repeated except that an equivalent quantity of an appropriate 4,5-dihydro3H-2-benzazepine obtained from the previous examples is used as the starting material in conjunction with an appropriate alkyl or aralkyl halide to obtain the respective products listed below:

| Source of Starting Material | Product (Base=2,3,4,5-tetrahydro-1H-2-benzazepine) |
|---|---|
| xample: | |
| VIII-A | 1-phenyl-2-methyl-4-cyano-7,8-dimethoxy-Base. |
| VIII-B | 1-phenyl-2-($\beta$-phenethyl)-4-cyano-7-methoxy-Base. |
| VIII-B | 1-methyl-2-ethyl-4-cyano-7,8,9-trimethoxy-Base. |
| IX | 1-phenyl-2-methyl-4-ethoxycarbonyl-7,8-dimethoxy-Base. |
| X | 1-methyl-2-ethyl-4-propoxycarbonyl-7,8-dimethoxy-Base. |
| XI | 1-phenyl-2-methyl-4-carboxy-7,8-dimethoxy-Base. |
| XIV | 1-propyl-2-methyl-4-carbamoyl-7,9-dimethoxy-Base. |
| XVI-A | 1-phenyl-2-methyl-4-(N',N'-dimethylcarbamoyl)-7,8-dimethoxy-Base. |
| XVI-B | 1-phenyl-2-methyl-4-(N'-ethylcarbamoyl)-7,8-dimethoxy-Base. |
| XVII-A | 1-(p-chlorophenyl)-2-ethyl-4-ethoxycarbonyl-7,8-dimethoxy-Base. |
| XVII-B | 1-(p-chlorophenyl)-2-methyl-4-cyano-7-methoxy-Base. |
| XVIII-A | 1-(p-chlorophenyl)-2-($\beta$-phenethyl)-4-carboxy-7,8-dimethoxy-Base. |
| XVIII-B | 1-(p-chlorophenyl)-2-methyl-4-carbamoyl-7,8-dimethoxy-Base. |

What is claimed is:

1. A chemical compound selected from the group consisting of a 2-benzazepine having the formula:

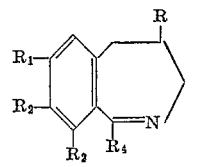

(I)

and a 2-benzazepine having the formula:

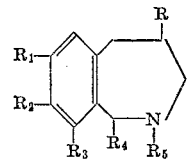

(II)

wherein R is a member selected from the group consisting of cyano, lower alkoxycarbonyl, carboxy, carbamoyl, N - (lower alkyl)carbamoyl, N,N - di - (lower alkyl) carbamoyl and aminomethyl; $R_1$ is lower alkoxy; $R_2$ and $R_3$ are each a member selected from the group consisting of hydrogen and lower alkoxy; $R_4$ is a member selected from the group consisting of lower alkyl, phenyl and halophenyl; and $R_5$ is a member selected from the group consisting of hydrogen, lower alkyl and phenethyl; provided that, when said $R_3$ is lower alkoxy, said $R_4$ is lower alkyl.

2. The compound of claim 1 which is 4,5-dihydro-1-phenyl-4-cyano-7,8-dimethoxy-3H-2-benzazepine.

3. The compound of claim 1 which is 4,5-dihydro-1-phenyl - 4 - ethoxycarbonyl - 7,8 - dimethoxy - 3H - 2-benzazepine.

4. The compound of claim 1 which is 4,5-dihydro-1-phenyl-4-carboxy-7,8-dimethoxy-3H-2-benzazepine.

5. The compound of claim 1 which is 4,5-dihydro-1-phenyl-4-carbamoyl-7,8-dimethoxy-3H-2-benzazepine.

6. The compound of claim 1 which is 4,5-dihydro-1-phenyl - 4 - (N' - t - butylcarbamoyl) - 7,8 - dimethoxy-3H-2-benzazepine.

7. The compound of claim 1 which is 4,5-dihydro-1-phenyl - 4 - (N',N' - dimethylcarbamoyl) - 7,8 - dimethoxy-3H-2-benzazepine.

8. The compound of claim 1 which is 4,5-dihydro-1-(p - chlorophenyl) - 4 - ethoxycarbonyl - 7,8 - dimethoxy-3H-2-benzazepine.

9. The compound of claim 1 which is 4,5-dihydro-1-phenyl-4-aminomethyl-7,8-dimethoxy-3H-2-benzazepine.

10. The compound of claim 1 which is 4,5-dihydro-1-methyl - 4 - ethoxycarbonyl - 7,8,9 - trimethoxy - 3H - 2-benzazepine.

11. The compound of claim 1 which is 4,5-dihydro-1-(p - chlorophenyl) - 4 - ethoxycarbonyl - 7 - methoxy-3H-2-benzazepine.

12. The compound of claim 1 which is 2,3,4,5-tetrahydro - 1 - phenyl - 4 - aminomethyl - 7,8 - dimethoxy-1H-2-benzazepine.

13. The compound of claim 1 which is 2,3,4,5-tetrahydro - 1 - phenyl - 4 - carbamoyl - 7,8 - dimethoxy - 1H-2-benzazepine.

14. The compound of claim 1 which is 2,3,4,5-tetrahydro - 1 - phenyl - 2 - methyl - 4 - (N' - t - butylcarbamoyl)-7,8-dimethoxy-1H-2-benzazepine.

References Cited

UNITED STATES PATENTS 3,242,164   3/1966   Sherlock _____ 260—239

ALTON D. ROLLINS, Primary Examiner

U.S. Cl. X.R.

260—465, 471; 424—244

PC-1050
(5/69)

UNITED STATES PATENT OFFICE
CERTIFICATE OF CORRECTION

Patent No. 3,483,186        Dated December 9, 1969

Inventor(s) Joseph A. Meschino

It is certified that error appears in the above-identified patent and that said Letters Patent are hereby corrected as shown below:

Column 1, line 67, the word "observed" is mispelled. Column 2, line 57, the word "alkylcarbamoyl" is mispelled. Column 4, line 55, the word "hydroxy" should be omitted. Column 10, Example XXII, under Ex. XVI-A, the word "dimethylcarbamoyl" is mispelled. Column 11, Ex. XXIV, under EX. X the numeral "8" should read -- 9 --.

SIGNED AND
SEALED

JUN 3 0 1970

(SEAL)
Attest:

Edward M. Fletcher, Jr.
Attesting Officer

WILLIAM E. SCHUYLER, JR.
Commissioner of Patents